(12) United States Patent
Ge et al.

(10) Patent No.: US 7,742,392 B2
(45) Date of Patent: Jun. 22, 2010

(54) BLIND CARRIER FREQUENCY OFFSET ESTIMATOR BASED ON SINGLE-OFDM-SYMBOL PN RANGING CODE IN MULTI-USER OFDMA UPLINK

(75) Inventors: Yiqun Ge, Beijing (CN); Xutao Zhou, Beijing (CN); Wuxian Shi, Beijing (CN)

(73) Assignee: STMicroelectronics (Beijing) R&D Company Ltd., Beijing (CN)

( * ) Notice: Subject to any disclaimer, the term of this patent is extended or adjusted under 35 U.S.C. 154(b) by 166 days.

(21) Appl. No.: 11/833,157

(22) Filed: Aug. 2, 2007

(65) Prior Publication Data

US 2008/0056116 A1    Mar. 6, 2008

(30) Foreign Application Priority Data

Aug. 31, 2006    (CN) .................... 2006 1 0063945

(51) Int. Cl.
*H04J 11/00* (2006.01)
(52) U.S. Cl. .................... 370/208; 370/206; 370/209
(58) Field of Classification Search ......... 370/203–208, 370/342, 335, 441
See application file for complete search history.

(56) References Cited

U.S. PATENT DOCUMENTS

| | | | |
|---|---|---|---|
| 7,120,201 B2* | 10/2006 | Huang et al. ............. 375/267 |
| 7,218,693 B2* | 5/2007 | Troulis ..................... 375/346 |
| 7,324,432 B1* | 1/2008 | Kim .......................... 370/208 |
| 2002/0176519 A1* | 11/2002 | Chiodini et al. ........... 375/324 |
| 2004/0192218 A1* | 9/2004 | Oprea ........................ 455/73 |
| 2005/0135230 A1 | 6/2005 | Yu et al. |
| 2005/0141474 A1 | 6/2005 | Lee et al. |
| 2006/0018412 A1* | 1/2006 | Jung et al. ................. 375/341 |
| 2006/0072486 A1* | 4/2006 | Park ........................... 370/310 |
| 2006/0239181 A1* | 10/2006 | Hosur ........................ 370/208 |
| 2007/0202903 A1* | 8/2007 | Ge et al. .................... 455/502 |
| 2007/0211807 A1* | 9/2007 | Han et al. .................. 375/260 |
| 2007/0217526 A1* | 9/2007 | Park et al. .................. 375/260 |
| 2008/0095249 A1* | 4/2008 | Yoon et al. ................. 375/260 |

* cited by examiner

*Primary Examiner*—Ian N Moore
*Assistant Examiner*—Matthew Hopkins
(74) *Attorney, Agent, or Firm*—Lisa K. Jorgenson; William J. Kubida (57) ABSTRACT

A blind carrier frequency offset estimator is based on a single-OFDM-symbol training sequence in multi-user OFDMA uplink. Through multiple access interference modeling and analysis, a virtual user is employed that occupies the all null sub-carriers. By minimizing the energy leakage on the virtual user in term of tentative frequency offsets, the estimator can approach the real frequency offset. The estimator performs only on frequency-domain, simplifies interference calculations, and lowers the rank of the matrix. An iterative computation method is used to approach the real frequency offset.

16 Claims, 6 Drawing Sheets

BLIND CARRIER FREQUENCY OFFSET
ESTIMATOR BASED ON
SINGLE-OFDM-SYMBOL PN RANGING
CODE IN MULTI-USER OFDMA UPLINK

RELATED APPLICATION

The present application claims priority of Chinese Application No. 200610063945.3 filed Aug. 31, 2006, which is incorporated herein in its entirety by this reference.

BACKGROUND OF THE INVENTION

The present invention relates to wireless transmission, and more particularly to a method for estimating a carrier frequency offset for an interleaved OFDMA uplink receiver.

As a widely used technique for high data rate wireless transmission, the OFDM (Orthogonal Frequency Division Multiplexing) technique makes use of a set of overlapping but orthogonal sub-carriers to reach high spectrum efficiency. Inheriting from OFDM, OFDMA (orthogonal frequency division multiple access) has been proposed in many broadband wireless systems to provide more flexible wireless access scheme and to take more advantage of diversity gain by allocating a user a set of permutation-driven interleaved sub-carriers that guarantee a large sub-carrier spacing for each user.

Working in a mobile wireless environment, OFDMA is subject to synchronization errors, such as the misalignments from the terminals to the base-station, the discordances between the oscillator of the base-station and those of the terminals, and Doppler shifts of the terminals. Like the OFDM technique, OFDMA is so sensitive to the synchronization errors that a small frequency offset would lead to the loss of the orthogonality among the sub-carriers, and that a short time delay would result in the complex exponential twiddle on the frequency-domain.

The time-domain received signal in uplink is a multiplex of the multi-user signals that are subject to the different frequency offsets, time delays, and channel distortions. The interleaving topology of OFDMA deteriorates this issue by turning the ICI (inter-channel-interference) among the sub-carriers to the MAI (multiple access interference) among users. Besides, synchronization errors start to fluctuate when a user moves fast.

In order to keep the synchronization of terminals and base-station, a ranging process is taken to detect the synchronization errors of a terminal and to control the adjustment of the terminal's transmission in a close loop between this terminal and the base-station.

Functionally, the ranging process is classified into initial ranging and periodic ranging. Initial ranging takes place when a terminal is (re-)registered into the network; while periodic ranging is performed to keep the synchronization between a terminal and the base-station during its constant transmission. Usually, the initial ranging consumes more signaling resources by transmitting multiple OFDM symbols training sequence in uplink by which the base-station receiver is able to estimate the synchronization errors accurately but in relative long time interval; and the periodic ranging needs single OFDM symbol training sequence in uplink by which the base-station receiver can estimate the synchronization errors in a short time interval.

The synchronization errors of a low mobile or even fixed terminal may change so slowly that after the initial ranging reduces the synchronization errors of the terminal under an acceptable criterion, the base-station hardly performs any periodic ranging for its maintenance. But, once the terminal speeds up, its synchronization errors may fluctuate dramatically so as to require frequent periodic ranging processes. Among the synchronization errors, frequency offset is the most important one, for it would destroy the orthogonality causing MAI. (The phase rotations resulting from the time delays can be, more or less, compensated by the channel estimator.)

In conventional OFDM system uplink, a common pre-defined training sequence (ranging code) is transmitted on the overall sub-carrier in one OFDM symbol. And with a repetitious structure on the time-domain, this training sequence can be taken by ML (maximum likelihood) algorithm to estimate the frequency offset. However, this kind of ranging code doesn't work in OFDMA uplink, because 1) the ranging code by no means occupies the overall band; and 2) it isn't a common pre-defined training sequence but a CDMA (code division multiplex access) code generated by PN (pseudo-noise) polynomial in order to distinct terminals.

An alternative to estimate the frequency offset in OFDMA uplink is to repeatedly transmit a CDMA ranging code in multiple consecutive OFDM symbols (on the partial band) with phase continuity on the time-domain. Then, the base-station receiver can still apply ML to the repetitious training sequence. This method is taken in the initial ranging.

Figure 1:
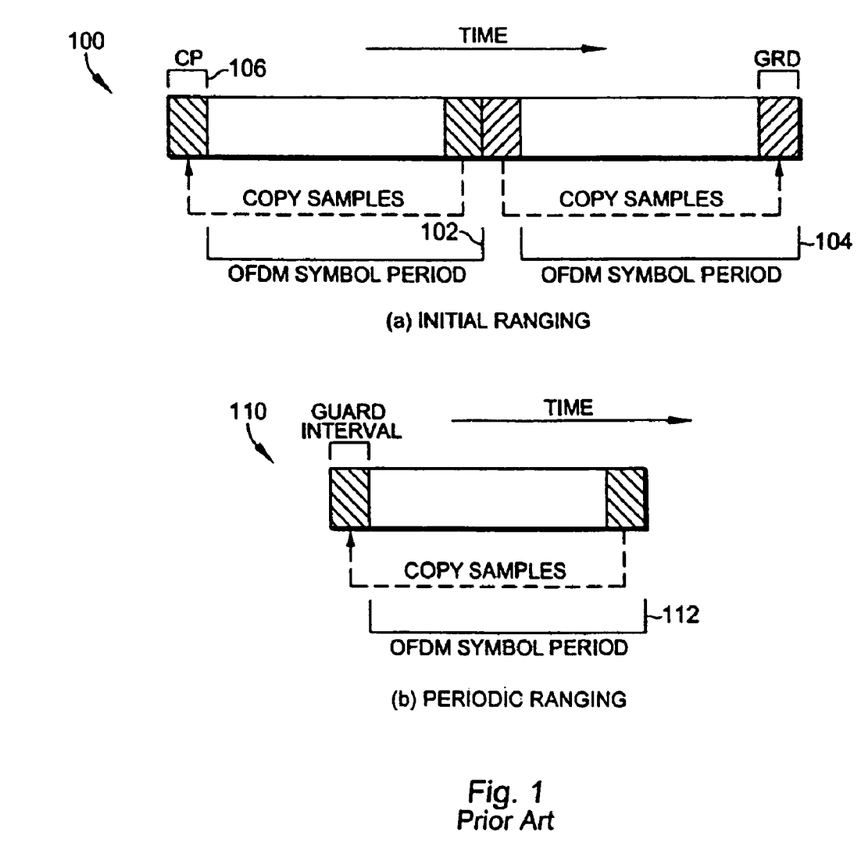
FIG. 1(a) is a diagram of an initial ranging method.
FIG. 1(b) is a diagram of a periodic ranging method according to the prior art.

IEEE802.16e OFDMA system adopts initial ranging and periodic ranging. FIG. 1 shows the mandatory initial ranging and periodic ranging.

Figure 1A:
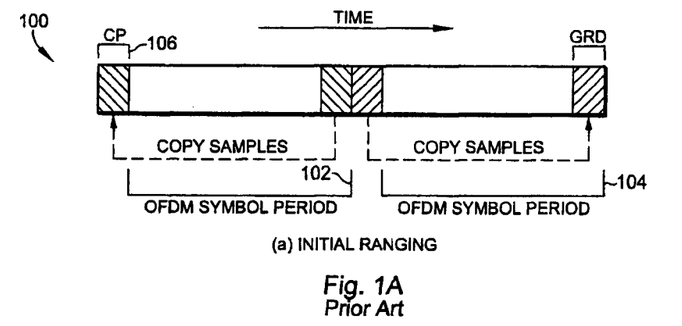

FIG. 1(a) is the time-domain illusion 100 of the initial-ranging transmission. The initial-ranging transmission is performed during two consecutive OFDM symbol periods 102 and 104 with copies of specific duration of last samples as CP 106.

Figure 1B:
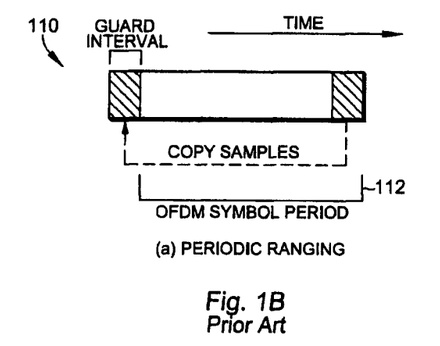

FIG. 1(b) is the time-domain illusion 110 of the periodic ranging transmission. The periodic ranging transmission is performed during one OFDM symbol period 112 with a copy of specific duration of last samples as CP.

These repetitions of symbol period, termed CP, provide multipath immunity as well as tolerance for symbol time synchronization errors.

Initial ranging serves registering a new terminal into network. The time delays, frequency offsets, and transmission power of an un-registered terminal shall be estimated and adjusted to guarantee its on-going reliable transmission. A base-station grants an initial ranging opportunity by allocating ranging channels in an uplink sub-frame. The grant information is encapsulated into a UL_MAP that is broadcast in the downlink sub-frame. Given a ranging opportunity, terminals collide on these ranging channels by transmitting a CDMA code, denoted as an initial ranging code, which is randomly selected from a CDMA code candidate set specified by the base-station. This ranging code will be detected and transmitted together with the parameter adjustment message in a ranging response during the next downlink opportunity to notify the terminal to be adjusted.

Periodic ranging serves re-synchronizing a terminal with the base-station. A base-station grants a periodic ranging opportunity in an uplink sub-frame. The terminals collide on the ranging channel by transmitting a CDMA code that is randomly selected from a candidate set specified by the base-station.

A prior art solution has been proposed by Young-Ha Lee et al. This solution is applied to solve synchronization of an uplink between a subscriber station and a base-station by utilizing the ranging system in a multiple access wireless communication system of OFDMA.

However, this solution is only restricted to timing synchronization rather than frequency synchronization. Since OFDMA system is very sensitive to frequency synchronization errors in a mobile environment, performing the synchronization process without considering frequency offset becomes inapplicable in practice.

Another prior art solution has been proposed by Chang-Wahn Yu et al. This solution is applied to process the ranging channels to measure the propagation delay and the power of each subscriber station.

In an OFDMA system, each subscriber station has different carrier frequency offsets if the system is not synchronized. The orthogonality among these subcarriers of the different subscriber stations are thus destroyed due to MAI. Therefore, the insufficiencies of the above solution are that this solution does not take into account of frequency offset either.

A challenge to the periodic ranging is how to estimate the CFO based on a single-OFDM-symbol CDMA ranging code, when it comes to a mobile environment.

SUMMARY OF THE INVENTION

According to the present invention, a method for blind carrier frequency offset estimator is based on a single-OFDM-symbol training sequence in multi-user OFDMA uplink. Through multiple access interference modeling and analysis, a virtual user is employed that occupies all null sub-carriers. By minimizing the energy leakage on the virtual user in term of tentative frequency offsets, the method of the present invention can approach the real frequency offset. Besides, the method of the present invention is performed only in the frequency-domain, simplifies interference calculations, and lowers the rank of the matrix. Finally, an iterative computation method is used to approach the real frequency offset.

According to the present invention, a frequency offset estimation method for interleaved OFDMA uplink estimates frequency offset based on a one OFDM symbol (on the partial band) CDMA training sequence, is a blind estimation, i.e. without knowing the transmitted CDMA ranging code, and is a low complexity method. The method of the present invention has the advantage that it is performed only on the frequency-domain. The signals do not need to be transformed to the time-domain as is done with conventional CFO estimators. The method of the present invention has the additional advantage of being a low complexity and memory saving method, because the introduction of an influence factor for MAI modeling greatly reduces the rank of the correction matrix.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF THE INVENTION

Prior to the introduction of the CFO estimator, we shall develop a base-band signal model for the interleaving OFDMA uplink. Starting by constructing a single-user signal model, we will deduce a multi-user signal model with CFO and a time-variant frequency-selective channel.

Figure 2:
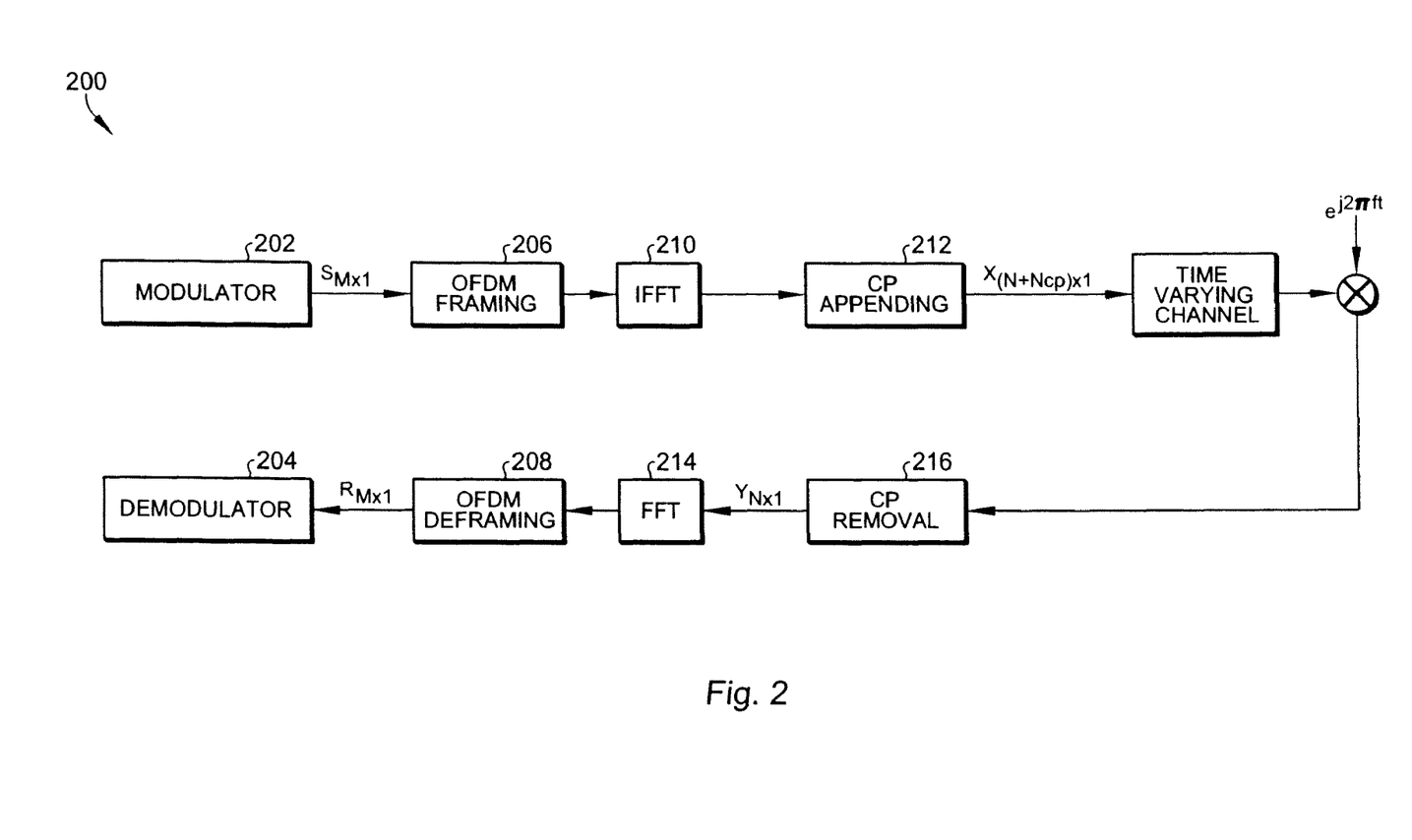
FIG. 2 is a diagram of a single-user signal model according to the present invention.

An equivalent base-band single-user transmitter/receiver 200 is illustrated in FIG. 2. FIG. 2 illustrates a single-user base-band signal model of an interleaving OFDMA system. The out-modem part of the transmitter, such as randomization, channel coding, etc, is simplified as a modulator 202, and the receiver part is simplified as a de-modulator 204 respectively. The OFDM Framing/DeFraming block 206, 208 is used for constructing/deconstructing the standard compatible OFDMA transmission frame. Also the IFFT transformation 210 converts the frequency-domain signal into time-domain and the CP is appended 212 to each OFDM symbol after IFFT transformation 210. On the receiver side, FFT transformation 214 and CP removal block 216 are implemented for inverse operation as a transmitter part.

Focusing on frequency offset estimation, we can safely simplify the outer-modem part of the transmitter as a (de-)modulator. Define complex-valued vector $S_{M\times1}=[s(0), s(1), s(2), \ldots, s(M-1)]^T$ as the signals from the modulator to be transmitted in one OFDM symbol. Then, the M signals are to be mapped onto one frequency-domain OFDM symbol vector (a complex vector of length of N×1) by a set of pre-defined index. The remaining (N−M) entries are set to be zeros. The mapping relationship can be realized by a position index $(sc(0), sc(1), \ldots, sc(M-1))$, that is, s(i) is mapped at the sc(i)-th entries of the frequency-domain OFDM symbol vector. Define a position matrix $P_{N\times M}=[\epsilon_{sc(0)}, \epsilon_{sc(1)}, \ldots, \epsilon_{sc(M-1)}]$, where $\epsilon_j$ is (N×1) zeros vector but with its j-th entry being 1. Thus, the frequency-domain OFDM symbol signal can be expressed as P·S. IFFT operation can be realized by left-multiplication of a (N×N) IFFT matrix $W^H$. The (k,l) entry of W is defined as $$N^{-\frac{1}{2}} \cdot e^{-j\frac{2\pi \cdot k \cdot l}{N}}.$$

The CP (cyclic prefix) operation is also represented by a left multiplication of the matrix $CP_{(Ncp+N)\times N}=[[O_{Ncp\times(N-Ncp)} \ I_{Ncp\times Ncp}]^T \ I_{N\times N}]^T$, where Ncp is length of CP. Finally, the transmitted signal vector $X_{(N+Ncp)\times 1}$ is:

$$X_{(N+Ncp)\times 1}=CP_{(Ncp+N)\times N} \cdot W_{N\times N}^H \cdot P_{N\times M} \cdot S_{M\times 1} \quad \text{Equation 1}$$

The signal vector X is sequentially transmitted through a time-varying frequency selective channel. This continuous channel distortion can be modeled as:

$$y(t)=e^{j2\pi F_0 t} \cdot h(\tau,t) \otimes x(t)+n(t)= \quad \text{Equation 2}$$
$$e^{j2\pi F_0 t}\int_0^{\tau max} h(\tau,t)x(t-\tau)d\tau+n(t)$$

where h(τ, t) is channel impulse response simplified to h(τ) during one OFDM symbol; $F_0$ is CFO; n(t) is AWGN noise;

$\tau_{max}$ is the maximum excess delay. Discrete-time equivalent of Equation 2 by replacing t with i/F$_s$, (F$_s$ is the sampling frequency), is:

$$y(i) = e^{j2\pi f_0 i} \sum_{l=0}^{N_{max}-1} h(l)x(i-l) + n(i) \qquad \text{Equation 3}$$

where $N_{max}=\tau_{max} \cdot F_s$, $f_0=F_0/F_s$ is the normalized CFO. If $N_{max}<N_{CP}$, no ISI (inter-symbol-interference) occurs, so the received time-domain signal vector is:

$$Y_{N\times 1} = e^{j2\pi f_0 N_{CP}} \cdot \text{diag}(g(f_0))_{N\times N} \cdot W_{N\times N}{}^H \cdot P_{N\times M} \cdot \text{diag}(h)_{M\times M} \cdot S_{M\times 1} \qquad \text{Equation 4}$$

where $g(f)=[e^{j2\pi \cdot f \cdot 0}, e^{j2\pi \cdot f \cdot 1}, \ldots, e^{j2\pi \cdot f \cdot (N-1)}]$, and $h=[H(sc(0)), H(sc(1)), \ldots, H(sc(M-1))]$ (H(i) is designated for the channel frequency response at the i-th sub-carrier). The received frequency-domain signal can be expressed by left multiplications of a FFT matrix W and position matrix $P^T$:

$$R_{M\times 1} = e^{j2\pi f_0 N_{CP}} P^T \cdot W \cdot \text{diag}(g(f_0)) \cdot W^H \cdot P \cdot \text{diag}(h) \cdot S_{M\times 1} \qquad \text{Equation 5}$$

Equation 5 is the base-band signal transmission model of the inner-modem part. If $f_0=0$, i.e. no CFO presents, because the matrix $\text{diag}(g(f_0))=I_{N\times N}$. And with $W \cdot W^H = I_{N\times N}$ and $P^T \cdot P = I_{M\times M}$, we can rewrite R:

$$R_{M\times 1} = e^{j2\pi f_0 N_{CP}} \cdot \text{diag}(h) \cdot S_{M\times 1} \qquad \text{Equation 6}$$

Apparently, $f_0=0$ gives rise to no interference between sub-carriers.

Figure 3:
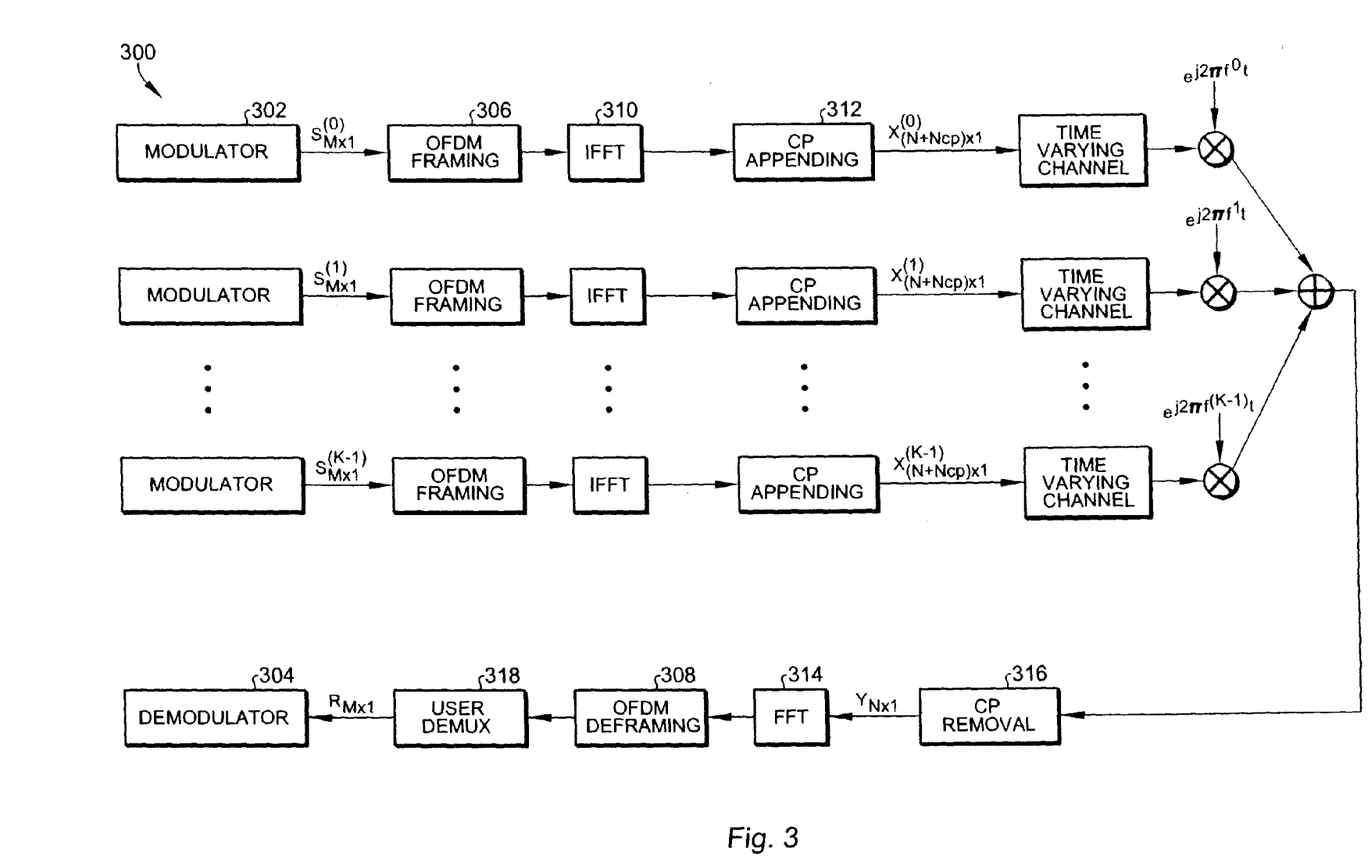
FIG. 3 is a multi-user signal model according to the present invention.

An equivalent base-band multi-user transmitter/receiver 300 is illustrated in FIG. 3. FIG. 3 illustrates a multi-user based band signal model for an interleaving OFDMA system. The out-modem part of transmitter, such as randomization, channel coding, etc, is simplified as a modulator 302, and the receiver part is simplified as a de-modulator 304, respectively. The OFDM Framing/DeFraming block 306, 308 is used for constructing/deconstructing the standard compatible OFDMA transmission frame. Also, the IFFT transformation 310 converts the frequency-domain signal into time-domain and the CP is appended 312 to each OFDM symbol after IFFT transformation 310. On the receiver side, FFT transformation 314 and CP removal block 316 are implemented for inverse operation as a transmitter part.

Comparing with the single user model, the user De-Mux block 318 is implemented on the receiver side to extract each single user data from its location within the OFDMA transmission frame.

In order to give out a multi-user signal model, we denote the superscript $(\cdot)^{(k)}$ as the assignment to the k-th user. Since one OFDM symbol is shared by several users without collision (overlapping), we have:

$$(P^{(k)})^T \cdot (P^{(l)}) = \begin{cases} I_{M^{(k)} \times M^{(l)}} & k = l \\ O_{M^{(k)} \times M^{(l)}} & k \neq l \end{cases} \qquad \text{Equation 7}$$

And $$\sum_{k=0}^{N_{user}-1} M^{(k)} \leq N - N_{left\_guard} - N_{right\_guard}.$$

Thus, the received time-domain signal can be a sum of those of individual users:

$$Y_{N\times 1} = \sum_{k=0}^{N_{user}-1} Y_{N\times 1}^{(k)} = \sum_{k=0}^{N_{user}-1} e^{j2\pi f_0^{(k)} N_{CP}} \cdot \text{diag}(g(f_0^{(k)})) \cdot W^H \cdot P^{(k)} \cdot \text{diag}(h^{(k)}) \cdot S^{(k)} \qquad \text{Equation 8}$$

Similarly, the received frequency-domain of the k-th user is:

$$R_{M^{(k)} \times 1}^{(k)} = \qquad \text{Equation 9}$$
$$e^{j2\pi f_0^{(k)} N_{CP}} (P^{(k)})^T \cdot W \cdot \text{diag}(g(f_0^{(k)})) \cdot W^H \cdot P^{(k)} \cdot \text{diag}(h^{(k)}) \cdot$$
$$S_{M^{(k)} \times 1}^{(k)} + \sum_{\substack{l=0, \\ l \neq k}}^{N_{user}-1} e^{j2\pi f_0^{(l)} N_{CP}} (P^{(k)})^T \cdot W \cdot \text{diag}(g(f_0^{(l)})) \cdot$$
$$W^H \cdot P^{(l)} \cdot \text{diag}(h^{(l)}) \cdot S_{M^{(l)} \times 1}^{(l)}$$

The first term on the right-hand side of Equation 9 is the received signal from the k-th user. If $f_0^{(k)} \neq 0$, the sub-carrier interference presents, denoted as self-interference. The second term on the right-hand side of Equation 9 includes the signals from the other users. If $f_0^{(l)}=0, \forall l, l \neq k$, the sum of the second term is zero because of Equation 7; otherwise, it introduces the interference from other users, denoted as MAI.

In order to design a blind CFO estimator, we shall introduce a concept of a "virtual user". As its name suggests, UL PUSC of IEEE802.16e system, one of the mandatory transmission structure, uses some of the sub-channels, that is, some sub-channels are deliberately set to zeros. These null sub-channels are uniformly distributed on the overall band in a given permutation way to separate different users. In a practical system, about 60%~75% sub-channels are used, while the remainders are null sub-channels against the MAI. Thus, despite the presence of the interferences due to the existing CFOs, their influence from one user on another user would greatly diminish along with the increasing of the sub-carrier distances between the two users.

Another issue is sectorization. Like other cellular systems, IEEE802.16e system sectorizes its cell. All of the available sub-channels, excluding the null sub-channels, are grouped into three segments. Each segment is assigned to a sector's usage. Concurrently, three sets of directional transmitter/receiver antenna arrays are installed at the BS for the sectors. Therefore, in a given sector, the signal energies (or interferences) from the neighboring sectors can be low enough to be considered as white noise. Accordingly, the sub-channels of the other segments can be regarded as null sub-channels too.

Taking into account the two points above, there are a number of null sub-channels in OFDMA uplink. These null sub-channels can be regarded as a special user that transmits only zero signals without CFO. We denote this null sub-channel set as "virtual user." Logically, it contributes no interferences on the other users; whereas the other users present interferences on it. Equation 10 expresses this relationship:

$$R_{M^{(null)} \times 1}^{(null)} = N_{M^{(null)} \times 1} + \sum_{l=0}^{N_{user}-1} (P^{(null)})^T \cdot W \cdot \text{diag}(g(f_0^{(l)})) \cdot W^H \cdot P^{(l)} \cdot \text{diag}(h^{(l)}) \cdot S_{M^{(l)} \times 1}^{(l)}$$

Equation 10 where the superscript $(\bullet)^{(null)}$ is designated for the assignment to the virtual user. The mapping relationship of the virtual user can be realized by a position index (null(0), null(1), . . . , null($M^{(null)}$−1)). And a null position matrix $P_{N \times M} = [\epsilon_{null(0)}, \epsilon_{null(1)}, \ldots, \epsilon_{null(M-1)}]$.

In an ideal synchronous system, i.e., $\omega_0^{(l)}=0$, $\forall l$, the virtual user only transmits the white noise; otherwise, the MAI from other users leaks on the virtual user's band. We name this MAI as "signal energy leakage."

Due to the fact that CFO gives rise to the signal energy leakage that augments the signal energy on the virtual user's band, we design a CFO estimator that minimizes the energy.

Ranging can be regarded as a specific user. Denote the superscript $(\bullet)^{(ranging)}$ as the assignment to the ranging user. Define a joint position index of the virtual user and the ranging user as ((null+ranging)(0), (null+ranging)(1), . . . , (null+ranging) ($M^{(null)}+M^{(ranging)}-1$))=(null(0), null(1), . . . , null ($M^{(null)}-1$))∪($sc^{(ranging)}(0)$, $sc^{(ranging)}(1)$, . . . , $sc^{(ranging)}$ ($M^{(ranging)}-1$)). The joint position matrix of the virtual user and the ranging user is:

$$P_{N \times (M^{(null)}+M^{(ranging)})}^{(null+ranging)} = \begin{bmatrix} \epsilon_{(null+ranging)(0)}, \epsilon_{(null+ranging)(1)}, \ldots, \\ \epsilon_{(null+ranging)(M^{(null)}+M^{(ranging)}-1)} \end{bmatrix}$$

Equation 11

The observed frequency-domain joint signal of the virtual user and the ranging user is:

$$R_{(M^{(null)}+M^{(ranging)}) \times 1}^{(null+ranging)} = e^{j2\pi f_0^{(ranging)} N_{CP}} (P^{(null+ranging)})^T \cdot W \cdot \text{diag}(g(f_0^{(ranging)})) \cdot W^H \cdot P^{(ranging)} \cdot \text{diag}(h^{(ranging)}) \cdot S_{M^{(ranging)} \times 1}^{(ranging)} + \sum_{\substack{l=0, \\ l \neq ranging}}^{N_{user}-1} e^{j2\pi f_0^{(l)} N_{CP}} (P^{(null+k)})^T \cdot W \cdot \text{diag}(g(f_0^{(l)})) \cdot W^H \cdot P^{(l)} \cdot \text{diag}(h^{(l)}) \cdot S_{M^{(l)} \times 1}^{(l)}$$

Equation 12

Assuming that the other users have already been synchronized with the BS, that is, $f_0^{(l)}=0$, $\forall l, l \neq k$, the second term of the right hand side of Equation 12 turns to zeros:

$$R_{(M^{(null)}+M^{(ranging)}) \times 1}^{(null+ranging)} =$$

Equation 13

$$e^{j2\pi f_0^{(ranging)} N_{CP}} (P^{(null+ranging)})^T \cdot W \cdot \text{diag}(g(f_0^{(ranging)})) \cdot W^H \cdot P^{(ranging)} \cdot \text{diag}(h^{(ranging)}) \cdot S_{M^{(ranging)} \times 1}^{(ranging)}$$

Multiple $R^{(null+ranging)}$ by correction matrixes in term of a tentative CFO $f^{(ranging)}$, and extract the signal of the virtual user:

$$R'^{(null)}_{M^{(nll)} \times 1} = (P^{(null)})^T \cdot W \cdot \text{diag}(g(f^{(ranging)})) \cdot W^H \cdot P^{(ranging+null)} \cdot R^{(nll+ranging)}$$

Equation 14

Replace Equation 13 into Equation 14:

$$R'^{(null)}_{M^{(nll)} \times 1} = e^{j2\pi f_0^{(ranging)} N_{CP}} \cdot (P^{(null)})^T \cdot W \cdot \text{diag}(g(f^{(ranging)} + f_0^{(ranging)})) \cdot W^H \cdot P^{(ranging)} \cdot \text{diag}(h^{(ranging)}) \cdot S_{M^{(ranging)} \times 1}^{(ranging)}$$

Equation 15

Equation 15 indicates that $R'^{(null)}$ is the signal leakage from the ranging user that is corrected by a tentative CFO $f^{(ranging)}$. Define a correct matrix $C^{(ranging)}(f)=(P(null))^T \cdot W \cdot \text{diag}(g(f^{(ranging)})) \cdot W^H \cdot P^{(null+ranging)}$. We re-write (14):

$$R'^{(null)}_{M^{(nll)} \times 1} = C^{(ranging)}(f) \cdot R^{(nll+ranging)}$$

Equation 16

We can introduce a cost function in terms of the signal energy of $R'^{(null)}$:

$$J^{(ranging)}(f) = (R'^{(null)}_{M^{(nll)} \times 1})^H \cdot R'^{(null)}_{M^{(nll)} \times 1} = (R^{(null+ranging)})^H \cdot (C^{(ranging)}(f))^H \cdot C^{(ranging)}(f) \cdot R^{(null+ranging)}$$

Equation 17

To explain why the estimated CFO minimizes the cost function $J^{(ranging)}(f)$, we note that in Equation 15 $f^{(ranging)}+f_0^{(ranging)}=0$ leads to $\text{diag}(g(f^{(ranging)}+f_0^{(ranging)}))=I_{N \times N}$, i.e. $R'^{(null)}=0$. Thus, relying on the cost function, the CFO estimator is given by:

$$\hat{f}_0^{(ranging)} = \arg\min_f J^{(ranging)}(f)$$

Figure 4:
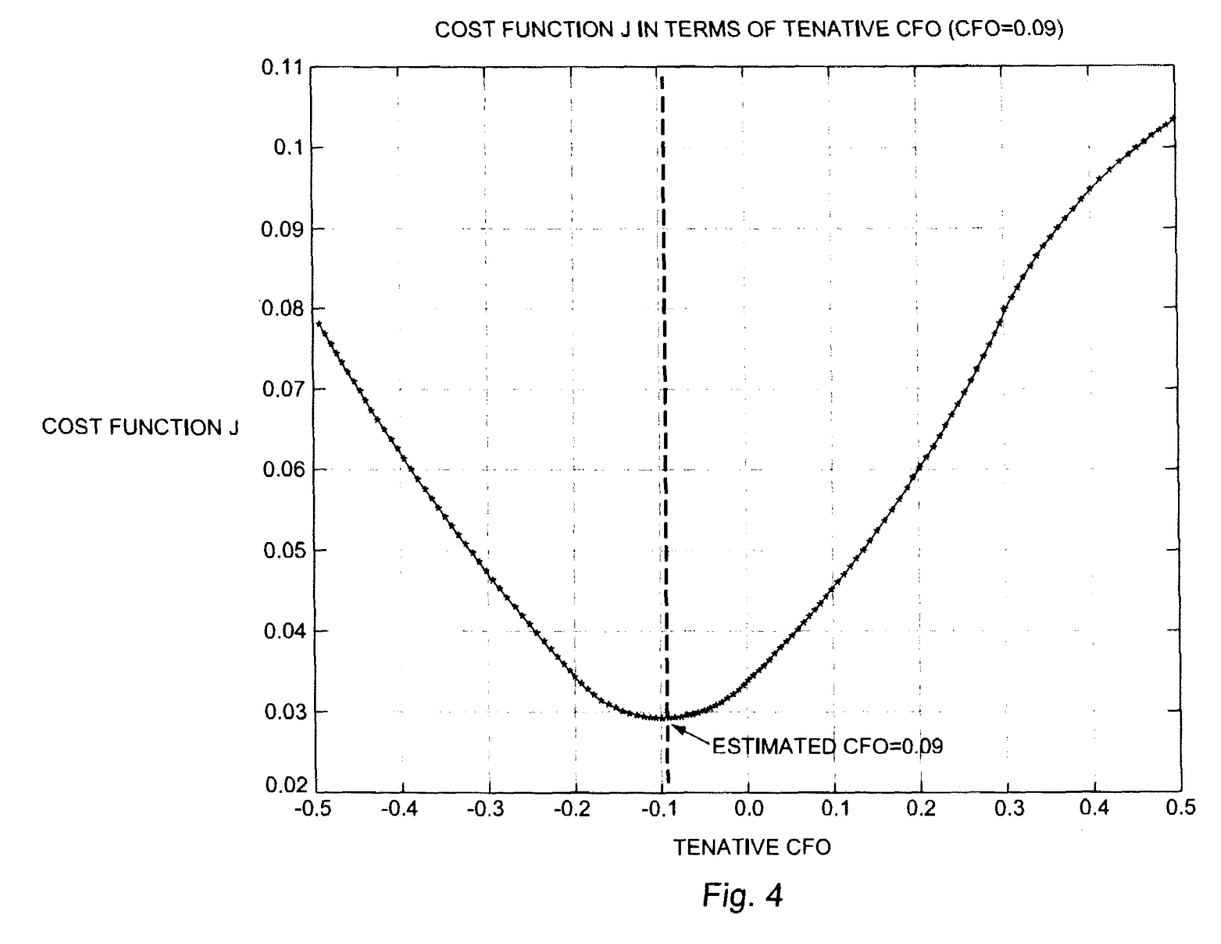
FIG. 4 is a plot of the cost function vs. the tentative CFO according to the present invention.

FIG. 4 shows the cost function in terms of tentative CFO.

As noted above, the CFO estimator is based on signal energy detection on the virtual user. However, the generation of the correction matrix $C^{(ranging)}(f)$ is high complex operation to be performed once $f^{(ranging)}$ is updated. To address the simplification of the CFO estimator, we start by analyzing MAI property in OFDMA uplink.

From Equation 9, the interference from the l-th user on the k-th user due to the CFO of the l-th user can be modeled as:

$$MAI(k,l,f_o^{(l)}) = e^{j2\pi f_0^{(l)} N_{CP}} (P^{(k)})^T \cdot$$
$$W \cdot \text{diag}(g(f_0^{(l)})) \cdot W^H \cdot P^{(l)} \cdot R_{M^{(l)} \times 1}^{(l)}$$

Equation 18

Define a MAI function $m(k,l,f) = (P^{(k)})^T \cdot W \cdot \text{diag}(g(f)) \cdot W^H \cdot P^{(l)}$, so the interference is re-written as:

$$MAI(k,l,f_o^{(l)}) = e^{j2\pi f_0^{(l)} N_{CP}} \cdot m(k,l,f_0^{(l)}) \cdot R_{M^{(l)} \times 1}^{(l)}$$

Equation 19

To investigate the MAI property, we discard the term $e^{j2\pi f_0^{(l)} N_{CP}}$, for it only causes the phase rotation. Without loss of generality, we can investigate MAI property by studying $m(k, l, f)$. The function $m(k, l, f)$ returns a $M^{(k)} \times M^{(l)}$ matrix, the $(u,v)$ entry of which is $$I(u,v) = (1/N) \cdot \sum_{n=0}^{N-1} e^{j2\pi(f+sc^{(l)}(u)-sc^{(k)}(v))n/N}.$$

It equals:

$$I(u,v) = \frac{\sin\pi(f+sc^{(l)}(u)-sc^{(k)}(v))}{N\sin\frac{\pi}{N}(f+sc^{(l)}(u)-sc^{(k)}(v))} \cdot e^{-j\pi(1-\frac{1}{N})(f+sc^{(l)}(u)-sc^{(k)}(v))}$$

Equation 20

Noting that for a large N:

$$\lim_{N \to \infty} \frac{\sin\pi(f+sc^{(l)}(u)-sc^{(k)}(v))}{N\sin\frac{\pi}{N}(f+sc^{(l)}(u)-sc^{(k)}(v))} =$$

$$\text{sinc}(f+sc^{(l)}(u)-sc^{(k)}(v))$$

Equation 21 the normalized power of $I(u,v)$ decreases dynamically with the increase of the distance $|sc^{(l)}(u)-sc^{(k)}(v)|$ for different $f$ ($f \neq 0$). It can be concluded that the interference from the u-th sub-carrier of the l-th user has the influence only on its limited neighboring sub-carriers. In the case of $f=0$, $\text{sinc}(sc^{(l)}(u)-sc^{(k)}(v))=0$ if and only if $|sc^{(l)}(u)-sc^{(k)}(v)| \neq 0$.

We introduce an interference influence factor d to express the "effective" interference limitation:

$$I(u,v) = \begin{cases} \text{sinc}(f+sc^{(l)}(u)-sc^{(k)}(v)) \cdot \\ e^{-j\pi(1-\frac{1}{N})(f+sc^{(l)}(u)-sc^{(k)}(v))} & |sc^{(l)}(u)-sc^{(k)}(v)| \leq d \\ 0 & \text{else} \end{cases}$$

Equation 22

With Equation 22, we can lower the rank of the correction matrix $C^{(ranging)}(f)$ by discarding those null sub-carriers from which the distances to the nearest ranging sub-carriers are greater than a pre-defined distance d. Re-define null sub-carrier position index:

$$\{sc^{(null')}(l) \in \text{null} \| sc^{(null)}(l) - sc^{(ranging)}(m)| \leq d, m = 0,1,\ldots M^{(ranging)}\}$$

And the $(u, v)$ entry of $C^{(ranging)}(f)$ is $I(u, v)$ in Equation 22 where $sc^{(l)}(u) = sc^{(null')}(u)$, $sc^{(k)}(v) = sc^{(ranging)}(v)$, and $f = f^{(ranging)}$.

Figure 5:
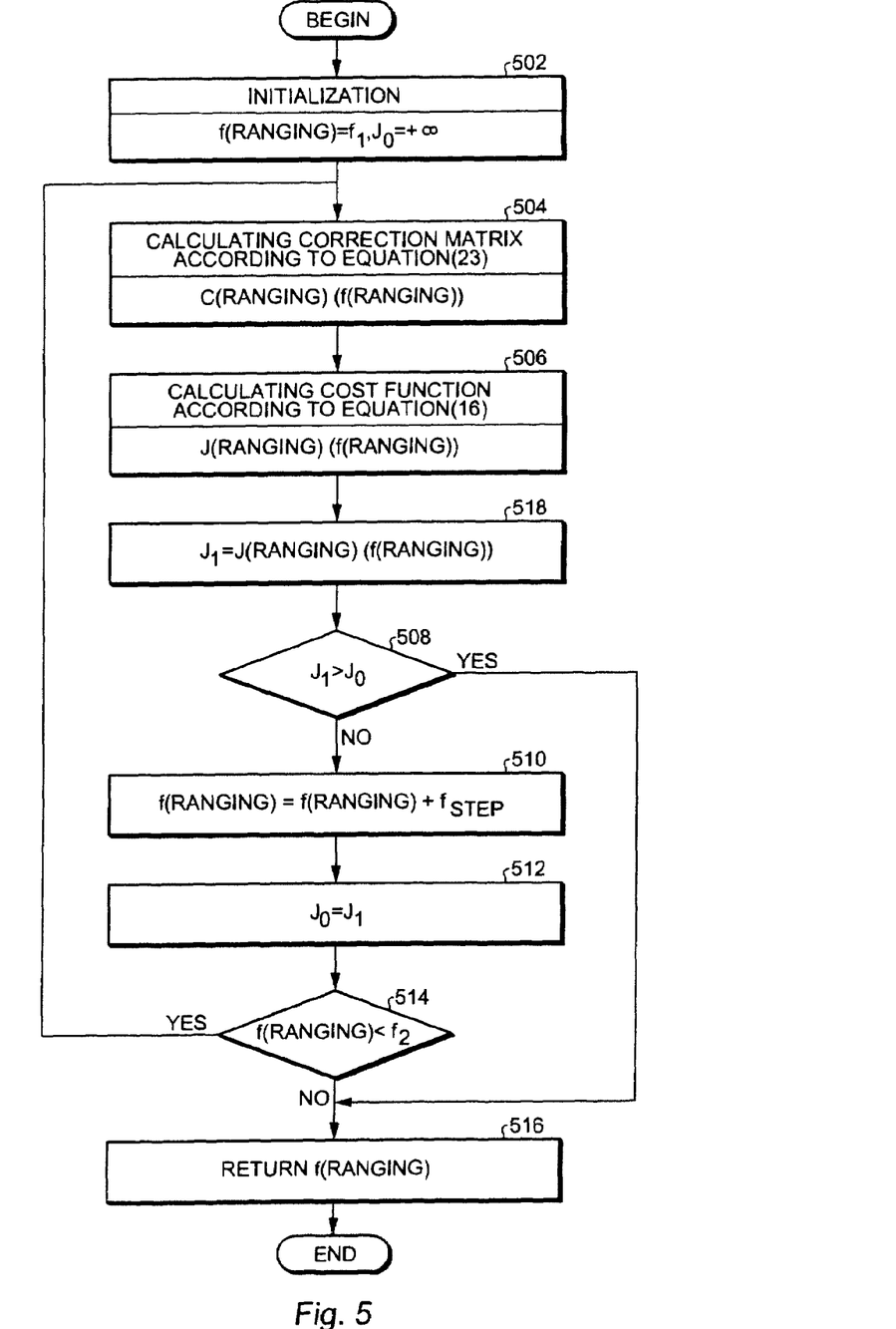
FIG. 5 is a flow chart of an iterative computational method according to the present invention.

The cost function of $J^{(ranging)}(f)$ is illustrated in FIG. 5. Knowing that $f_0^{(ranging)} \in (f_1, f_2)$, we can use iterative computation to reach the estimated $\hat{f}^{(ranging)}$:

1. $f^{(ranging)} = f_1$, $J_0 = +\infty$; (step 502)
2. Calculate $C^{(ranging)}(f^{(ranging)})$ with Equation 22; (step 504)
3. Calculate $$R'^{(null')}_{M^{(null')} \times 1}$$

based on Equation 16; step (506)
4. From $$R'^{(null')}_{M^{(null')} \times 1},$$

calculate $J^{(ranging)}(f^{(ranging)})$ with Equation 17, and $J_1 = J^{(ranging)}(f^{(ranging)})$; (step 518)
5. If $J_1 > J_0$, go to end and return $f^{(ranging)}$; (decision 508)
6. $f^{(ranging)} = f^{(ranging)} + \Delta f_{step}$, if $f^{(ranging)} > f_2$, go to end and estimate failure, otherwise $J_0 = J_1$ and go to step 2; (steps 510, 512, and 516)
7. End.

The flow chart of the iterative method of the present invention is shown in FIG. 5. The flow chart of FIG. 5 also includes step 518. Step 518 denotes J as J1 for the next step comparison and iteration. The flow chart also includes decision diamond 514 that ends the method of the present invention if the upper end of the carrier frequency offset is reached. The iterative method of the present invention can be enhanced if desired. For instance, $\Delta f_{step}$ can be adjusted according the $\Delta J = J_1 - J_0$; a LMS (least Mean Square) algorithm can also be proposed to improve better tracking performance.

The minimum value of the cost function is determined during the iterative method of the present invention, as is shown in FIG. 4. For the first time iteration, it is impossible for J1 to be greater than J0 (positive infinity), and in step 512 J1 is denoted as J0, so for the next step, the new frequency resulted cost function value is compared with J0, which has the same value of J1 (not positive infinity). By successive iterations, the method of the present invention is continued until the minimum value of cost function is found.

Figure 6:
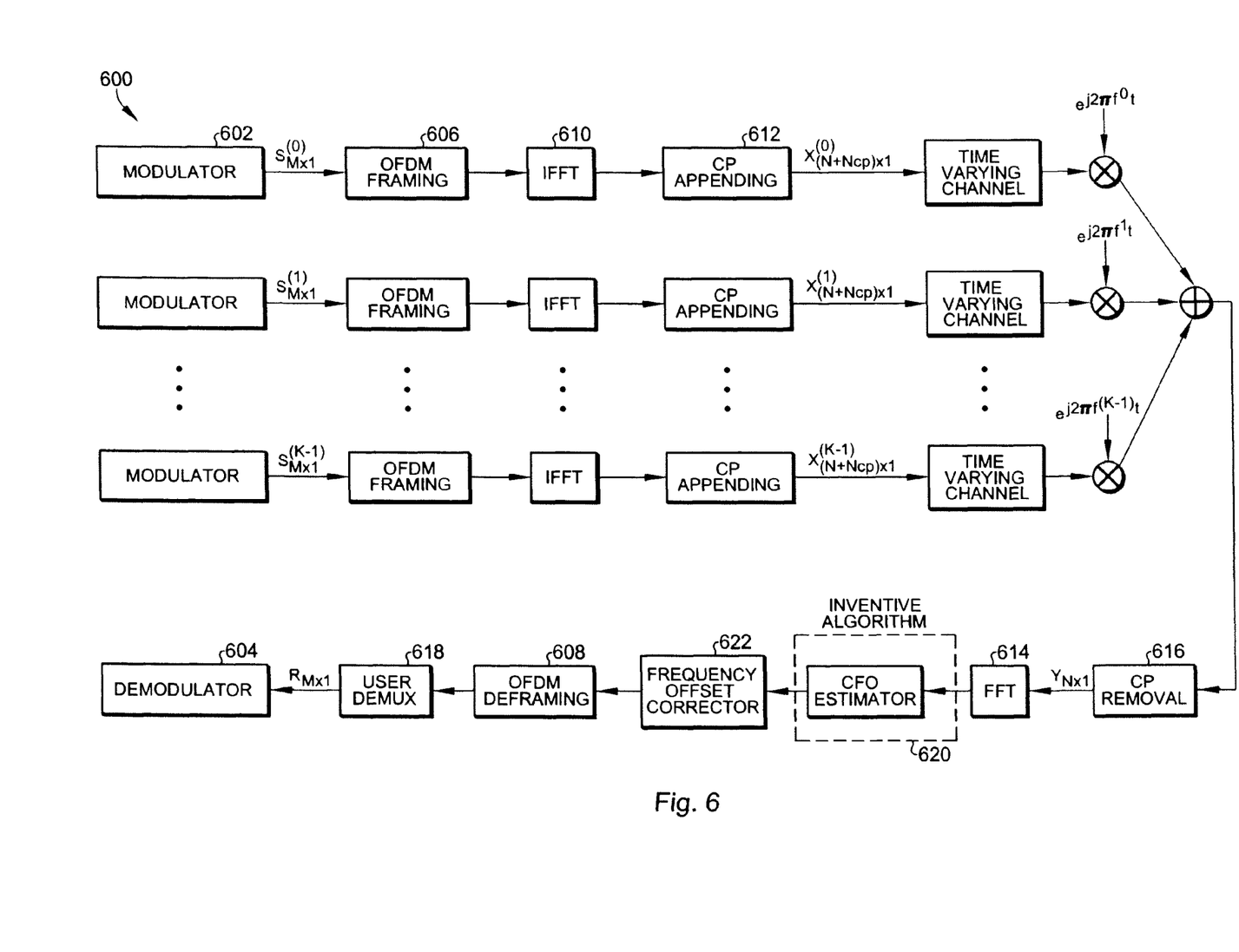
FIG. 6 is a diagram of an OFDMA system incorporating the method of the present invention.

Referring now to FIG. 6, an entire OFDMA system 600 is shown, including all of the blocks previously described. In addition, system 600 includes a CFO estimator block 620 incorporating the method of the present invention as was previously described. In addition, system 600 includes a frequency offset corrector block 622, which compensates for the frequency offset estimated by the CFO estimator block 620.

As is known in the art, the entire system 600, and blocks 620 and 622 in particular, can be implemented in an integrated circuit using DSP technology to realize all of the various mathematical steps and transformations in the method of the present invention.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

The following Abbreviations used herein are listed in Table I:

| | |
|---|---|
| AWGN | Additive White Gaussian Noise |
| BS | Base Station |
| CDMA | Code Division Multiple Access |
| CFO | Carrier Frequency Offset |
| CP | Cyclic Prefix |
| FFT | Fast Fourier Transform |
| ICI | Inter-Channel-Interference |
| IFFT | Inverse Fast Fourier Transform |
| LS | Least Square |
| ISI | Inter Symbol Interference |
| LMS | Least Mean Square |
| MAI | Multiple Access Interference |
| ML | Maximum Likelihood |
| OFDM | Orthogonal Frequency Division Multiplexing |
| OFDMA | Orthogonal Frequency Division Multiple Access |
| PN | Pseudo Noise |
| PUSC | Partial Used Sub Channel |

The following Parameters are used herein in Table II:

| | |
|---|---|
| M | number of the available sub-carriers |
| N | OFDM modulation size |
| $S^{(k)}$ | complex data vector of user k |
| $S_c^{(k)}$ | position index of user k |
| P | position matrix |
| $\epsilon_j$ | N x 1 zero vector but with its j-th entry being 1 |
| CP | cyclic prefix matrix |
| $N_{cp}$ | length of CP |
| $W^H$ | IFFT matrix |
| W | FFT matrix |
| X | transmitted signal vector |
| $h(\tau, t)$ | channel impulse response |
| n(t) | AWGN noise |
| $\tau_{max}$ | maximum excess delay |
| $F_s$ | sampling frequency |
| $F_0$ | CFO |
| $f_0$ | normalized CFO, $F_0/F_s$ |
| Y | received time-domain signal vector |
| I | identity matrix |
| $N_{left\text{-}guard}$ | left virtual guard size |
| $N_{right\text{-}guard}$ | right virtual guard size |
| R | received frequency-domain signal vector |
| R' | corrected received frequency-domain signal vector |
| C | correction matrix |
| J | cost function in term of the signal energy |
| m(k, l,f) | MAI function |

We claim:

1. A method for estimating a carrier frequency offset by an interleaved OFDMA system comprising:
    initializing a carrier frequency offset to provide an initial carrier frequency offset;
    initializing a cost function to provide an initial value of the cost function;
    calculating a correction matrix on a current frequency value;
    calculating a cost function using a calculated correction matrix value in a DSP integrated circuit to provide a calculated value of the cost function;
    comparing the calculated value of the cost function to the initial value of the cost function;
    if the calculated value of the cost function is greater than the initial value of the cost function, then the method is terminated and the initial carrier frequency offset is returned as the estimated carrier frequency offset;
    if the calculated value of the cost function is less than the initial value of the cost function, then the calculated value is set as a new cost function initial value;
    incrementally increasing the carrier frequency offset value; and
    repeating the correction matrix and cost function calculations until an estimated carrier frequency offset is returned, or until the range of the carrier frequency offset is exceeded,
    wherein the correction matrix is calculated using one of the following two formulae:

$$I(u, v) = \begin{cases} sinc(f + sc^{(l)}(u) - sc^{(k)}(v)) \cdot \\ e^{-j\pi(1-\frac{1}{N})(f+sc^{(l)}(u)-sc^{(k)}(v))} & |sc^{(l)}(u) - sc^{(k)}(v)| \le d \\ 0 & \text{else} \end{cases}$$

wherein I(u,v) is an identity matrix;
c is a constant;
f is frequency;
$sc^{(l)}$ is the position index of user "l";
u is an identity matrix entry;
v is an identity matrix entry;
$sc^{(k)}$ is the position index of user "k";
N is the OFDM modulation size; and
d is a predetermined distance; and $$J^{(ranging)}(f) = \left(R'^{(null)}_{M(null) \times 1}\right)^H \cdot R'^{(null)}_{M(null) \times 1} = \\ (R^{(null+ranging)})^H \cdot (C^{(ranging)}(f))^H \cdot C^{(ranging)}(f) \cdot R^{(null+ranging)}$$

wherein J is a cost function,
f is frequency;
R is a received frequency-domain signal vector;
R' is a corrected received frequency-domain signal vector;
M is the number of available sub-carriers; and
H is the Hermitian transpose.

2. The method of claim 1 wherein initializing the carrier frequency offset comprises initializing the carrier frequency offset within a predetermined range of frequency offset values.

3. The method of claim 1 wherein initializing the cost function value comprises initializing the cost function value at a predetermined high value.

4. The method of claim 1 wherein the estimated carrier frequency offset is found at a minimum cost function value.

5. The method of claim 1 further comprising a virtual user that occupies all null sub-carriers.

6. The method of claim 1 wherein the method is performed only in the frequency-domain.

7. The method of claim 1 wherein the method is performed without knowing a transmitted CDMA ranging code.

8. The method of claim 1 further comprising lowering the rank of a correction matrix by discarding null sub-carriers from which the distances to the nearest ranging sub-carriers are greater than a pre-defined distance.

9. An OFDMA system employing a method for estimating a carrier frequency offset, the method comprising:
- initializing a carrier frequency offset to provide an initial carrier frequency offset;
- initializing a cost function to provide an initial value of the cost function;
- calculating a correction matrix on a current frequency value;
- calculating a cost function using a calculated correction matrix value in a DSP integrated circuit to provide a calculated value of the cost function;
- comparing the calculated value of the cost function to the initial value of the cost function;
- if the calculated value of the cost function is greater than the initial value of the cost function, then the method is terminated and the initial carrier frequency offset is returned as the estimated carrier frequency offset;
- if the calculated value of the cost function is less than the initial value of the cost function, then the calculated value is set as a new cost function initial value;
- incrementally increasing the carrier frequency offset value; and
- repeating the correction matrix and cost function calculations until an estimated carrier frequency offset is returned, or until the range of the carrier frequency offset is exceeded,
- wherein the correction matrix is calculated using one of the following two formulae:

$$I(u, v) = \begin{cases} \text{sinc}(f + sc^{(l)}(u) - sc^{(k)}(v)) \cdot \\ e^{-j\pi(1-\frac{1}{N})(f+sc^{(l)}(u)-sc^{(k)}(v))} & |sc^{(l)}(u) - sc^{(k)}(v)| \leq d \\ 0 & \text{else} \end{cases}$$

wherein I(u,v) is an identity matrix;

c is a constant;
f is frequency;
$sc^{(l)}$ is the position index of user "l";
u is an identity matrix entry;
v is an identity matrix entry;
$sc^{(k)}$ is the position index of user "k";
N is the OFDM modulation size; and
d is a predetermined distance; and $$J^{(ranging)}(f) = \left(R'^{(null)}_{M^{(null)} \times 1}\right)^H \cdot R'^{(null)}_{M^{(null)} \times 1} = \\ \left(R^{(null+ranging)}\right)^H \cdot \left(C^{(ranging)}(f)\right)^H \cdot C^{(ranging)}(f) \cdot R^{(null+ranging)}$$

wherein J is a cost function;
f is frequency;
R is a received frequency-domain signal vector;
R' is a corrected received frequency-domain signal vector;
M is the number of available sub-carriers; and
H is the Hermitian transpose.

10. The OFDMA receiver of claim 9 wherein initializing the carrier frequency offset comprises initializing the carrier frequency offset within a predetermined range of frequency offset values.

11. The OFDMA receiver of claim 9 wherein initializing the cost function value comprises initializing the cost function value at a predetermined high value.

12. The OFDMA receiver of claim 9 wherein the estimated carrier frequency offset is found at a minimum cost function value.

13. The OFDMA receiver of claim 9 further comprising a virtual user that occupies all null sub-carriers.

14. The OFDMA receiver of claim 9 wherein the method is performed only in the frequency-domain.

15. The OFDMA receiver of claim 9 wherein the method is performed without knowing a transmitted CDMA ranging code.

16. The OFDMA receiver of claim 9 further comprising lowering the rank of a correction matrix by discarding null sub-carriers from which the distances to the nearest ranging sub-carriers are greater than a pre-defined distance.

* * * * *

UNITED STATES PATENT AND TRADEMARK OFFICE
CERTIFICATE OF CORRECTION

PATENT NO. : 7,742,392 B2  Page 1 of 1
APPLICATION NO. : 11/833157
DATED : June 22, 2010
INVENTOR(S) : Yiqun Ge, Xutao Zhou and Wuxian Shi

It is certified that error appears in the above-identified patent and that said Letters Patent is hereby corrected as shown below:

"Fig 1 Prior Art" should be labeled --Fig 1A Prior Art-- and --Fig 1B Prior Art--

(a) INITIAL RANGING

Fig. 1A
Prior Art (a) PERIODIC RANGING

Fig. 1B
Prior Art

Signed and Sealed this

Twenty-sixth Day of October, 2010

David J. Kappos
*Director of the United States Patent and Trademark Office*